US005995684A

United States Patent [19]

Beng et al.

[11] Patent Number: 5,995,684

[45] Date of Patent: Nov. 30, 1999

[54] USING CLASPS TO FIX A TRANSPARENT GLASS IN A HOUSING OF A FLATBED SCANNER

[75] Inventors: Lim Wei Beng, Pan-Chiao; Chen Pi-Chen; Kuo Chien Lung, both of Taipei, all of Taiwan

[73] Assignee: Primax Electronics Ltd., Taipei Hsien, Taiwan

[21] Appl. No.: 09/069,883

[22] Filed: Apr. 29, 1998

[51] Int. Cl.$^{6}$ .............................. G06K 7/00; G06K 9/20; H04N 1/04

[52] U.S. Cl. ........................... 382/312; 358/474; 358/494

[58] Field of Search ..................................... 358/474, 472, 358/486, 487, 494; 355/84, 233; 382/312, 313, 315

[56] References Cited

U.S. PATENT DOCUMENTS 5,065,842 11/1991 Nahar ........................................ 186/61
5,289,242 2/1994 Christensen ............................. 355/260
5,308,959 5/1994 Cherry .................................... 235/379

*Primary Examiner*—Jerome Grant, II
*Attorney, Agent, or Firm*—Winston Hsu

[57] ABSTRACT

The present invention relates to a housing of a flatbed scanner which uses a plurality of clasps to fix its transparent planar board. The housing comprises a rectangular transparent planar board for placing documents to be scanned and a rectangular case for placing a scanning module. The transparent planar board comprises front, rear, left and right ends, and the rectangular case comprises a rectangular opening installed on its top side for mounting the transparent planar board. A plurality of long-clasps and short-clasps are installed below the front and rear sides for mounting the front and rear ends of the transparent planar board respectively. The left side of the opening comprises two corner-clasps and the right side of the opening comprises a positioning device for mounting the left and right ends of the transparent planar board respectively and fixing the four ends of the transparent glass to the opening of the case.

11 Claims, 6 Drawing Sheets

USING CLASPS TO FIX A TRANSPARENT GLASS IN A HOUSING OF A FLATBED SCANNER

BACKGROUND OF THE INVENTION

1. Field of the Invention

The present invention relates to a housing of a flatbed scanner, and more particularly, to a housing of a flatbed scanner which uses a plurality of clasps to fix its transparent glass.

2. Description of the Prior Art

A prior art flatbed scanner has a rectangular transparent planar board made of glass for placing documents to be scanned and a rectangular case with a recess for placing such a scanning module or other components. The case comprises a bottom casing and a top casing. The top casing comprises a rectangular opening in the middle portion of its surface for installing the transparent planar board. The transparent planar board is commonly fixed to the opening of the top casing by double-sided tape to prevent dust and impurities from entering and causing damage to the scanner. However, this method is not only costly but also causes problems over time when the double-sided tape ages and begins to disintegrate from external influences such as temperature extremes, humidity and stress thus leading to instability of the transparent planar board.

SUMMARY OF THE INVENTION

It is therefore a primary objective of the present invention to provide a housing of a flatbed scanner which can be easily installed and securely fixed to the scanner's case inexpensively to solve the above mentioned problem.

In a preferred embodiment, the present invention provides a housing of a scanning device comprising:

a rectangular and transparent planar board having a front end, a rear end, a left end, and a right end for placing documents to be scanned; and a rectangular case for placing a scanning module comprising a rectangular top side and a rectangular opening installed in the middle portion of the top side having a front side, a rear side, a left side, and a right side for mounting the transparent planar board;

wherein at least one long-clasp is installed below the front side of the opening for fixing the front end of the transparent planar board, and at least one short-clasp is installed below the rear side of the opening for fixing the rear end of the transparent planar board, and two corner fixing means are installed under one of the right and left sides of the opening for fixing two corners of the corresponding end of the transparent planar board, and a positioning device is installed under the other of the right and left sides of the opening for fixing the corresponding end of the transparent planar board.

It is an advantage of the present invention that the housing of the flatbed scanner has a simple structure and can stably fix the transparent planar board to the case, reduce costs and simplify the assembly procedure of a flatbed scanner.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
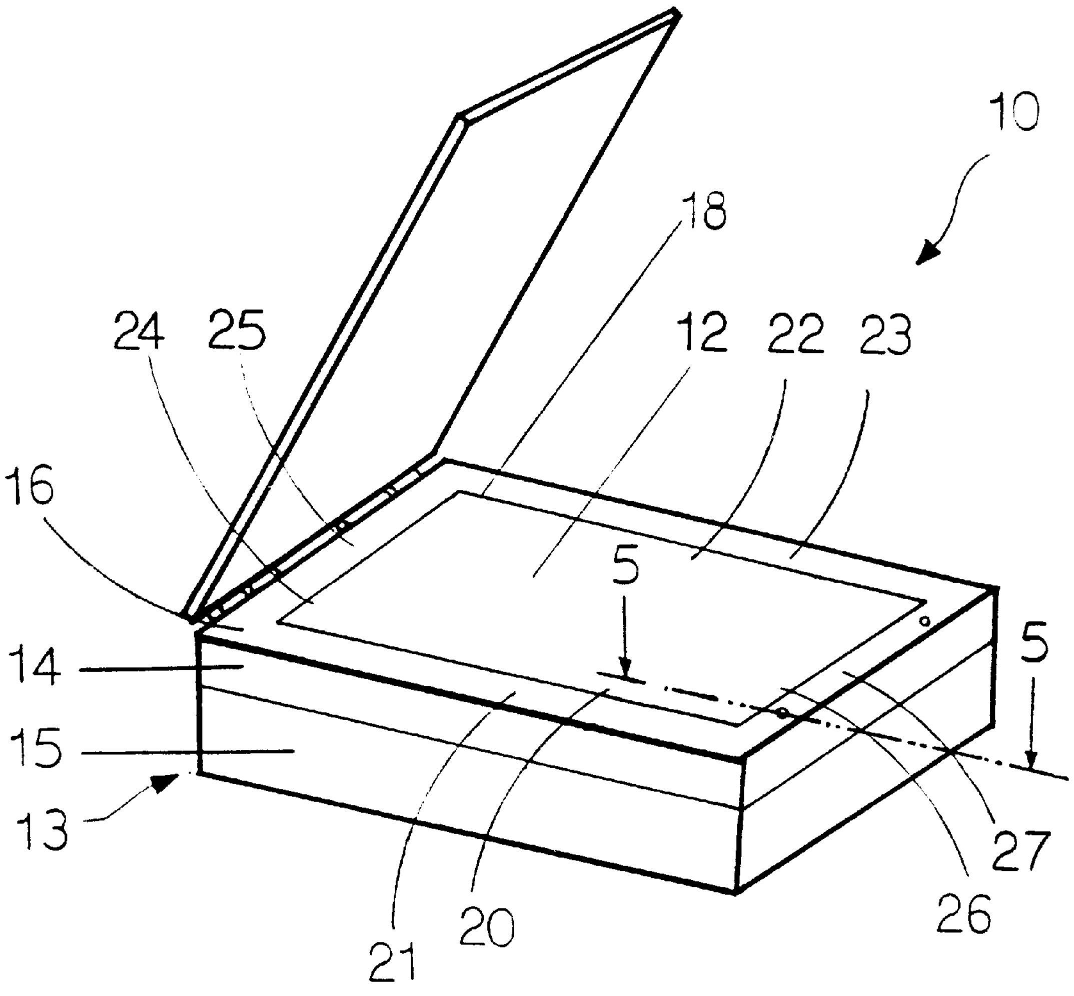
FIG. 1 is a perspective view of a housing of a flatbed scanner according to the present invention.

Please refer to FIG. 1. FIG. 1 is a perspective view of a housing 10 of a flatbed scanner according to the present invention. The housing 10 comprises a rectangular transparent planar board 12 having a front end 20, a rear end 22, a left end 24, and a right end 26 for placing documents to be scanned, and a rectangular case 13 for placing such a scanning module or other components (not shown). The rectangular case 13 is made by a bottom casing 15 combined with a top casing 14, and the top casing 14 further comprises a rectangular opening 18 on the middle portion of its top side 16 for installing a transparent planar board 12. The opening 18 further comprises a front side 21, a rear side 23, a left side 25, and a right side 27 for mounting the front end 20, rear end 22, left end 24 and right end 26 of the transparent planar board 12, respectively.

Figure 2:
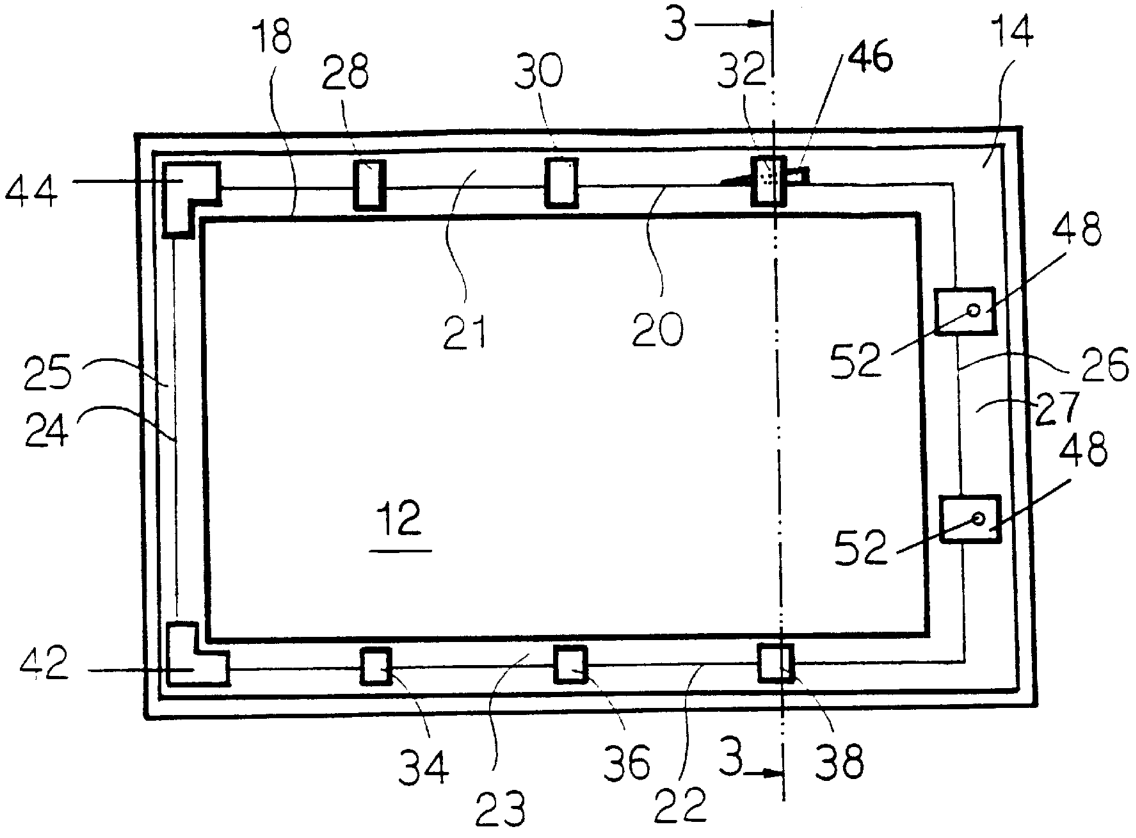
FIG. 2 is a bottom view of the top casing of the housing shown in FIG. 1.
Figure 3:
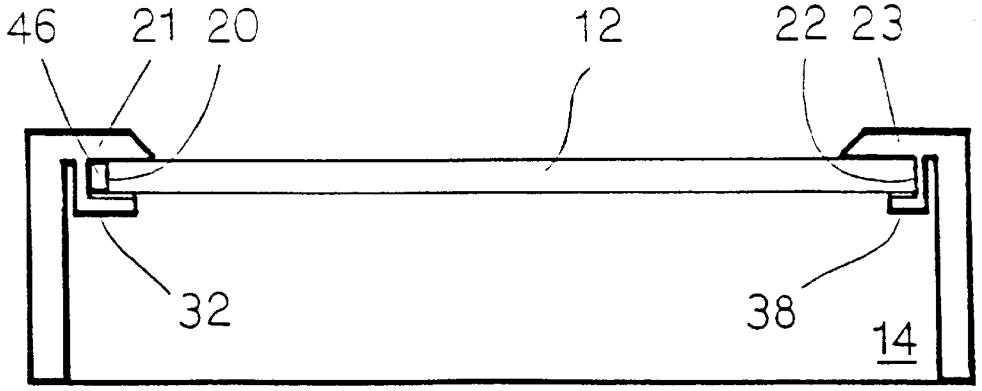
FIG. 3 is a sectional view along line 3—3 of the top casing shown in FIG. 2.
Figure 10:
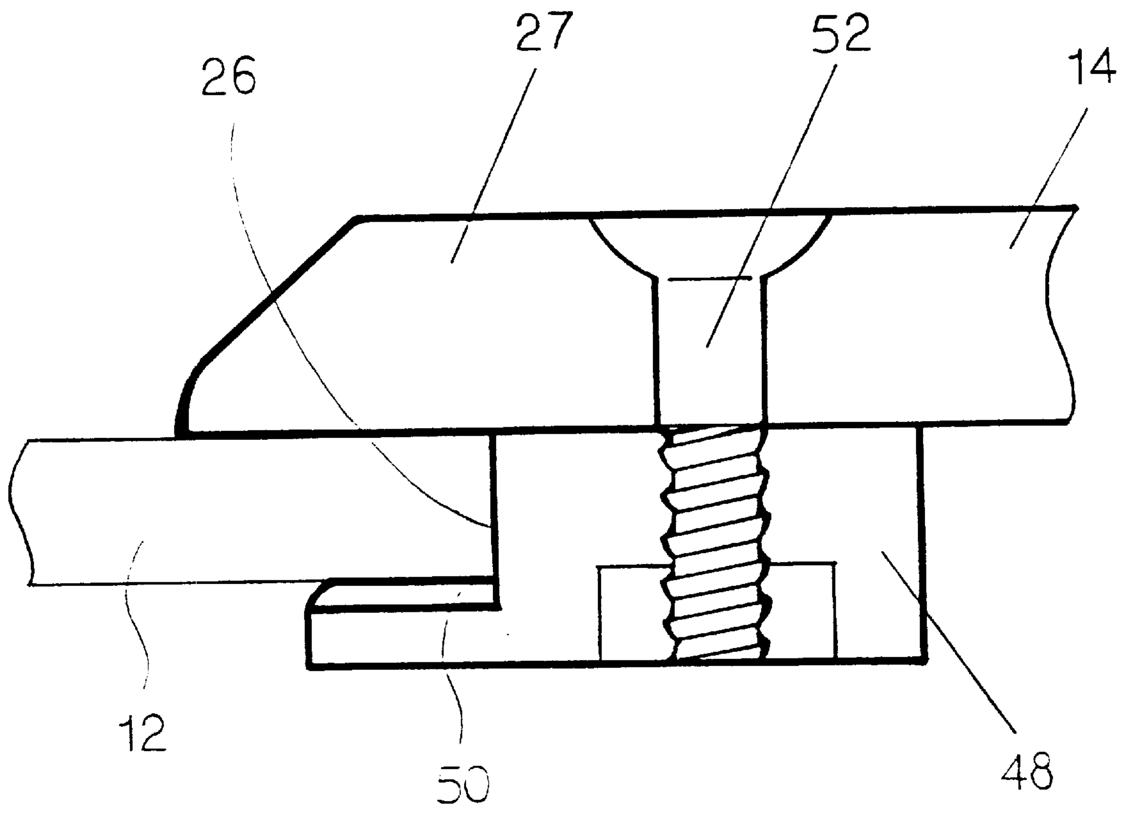
FIG. 10 is a sectional view along line 5—5 of one of the positioning devices shown in FIG. 2.

Please refer to FIG. 2 and FIG. 3. FIG. 2 is a bottom view of the top casing 14 of the housing 10 shown in FIG. 1. FIG. 3 is a sectional view along line 3—3 of the top casing 14 shown in FIG. 2. There are three long-clasps 28, 30 and 32 installed below the front side 21 of the opening 18 for fixing the corresponding front end 20 of the transparent planar board 12. Similarly, three short-clasps 34, 36 and 38 are installed below the rear side 23 of the opening 18 for fixing the corresponding rear end 22 of the transparent planar board 12. Two corner-clasps 42 and 44 are installed below the left side 25 of the opening 18 for fixing the two corners of the left end 24 of the transparent planar board 12, and two positioning devices 48 are installed below the right side 27 of the opening 18 for fixing the right end 26 of the transparent planar board 12. FIG. 10 illustrates a sectional view along line 5—5 of the positioning device 48 shown in FIG. 1. Each of the positioning devices 48 uses a screw 52 to fix the right end 26 of the transparent planar board 12. The housing 10 further comprises a latch 46 inserted in an empty space 40 between the long-clasp 32 and the front end 20 of the transparent planar board 12 for preventing front-and-rear sliding of the transparent planar board 12 between the long-clasp 32 and the short-clasp 38 below the opening 18 of the housing 10.

Figure 4:
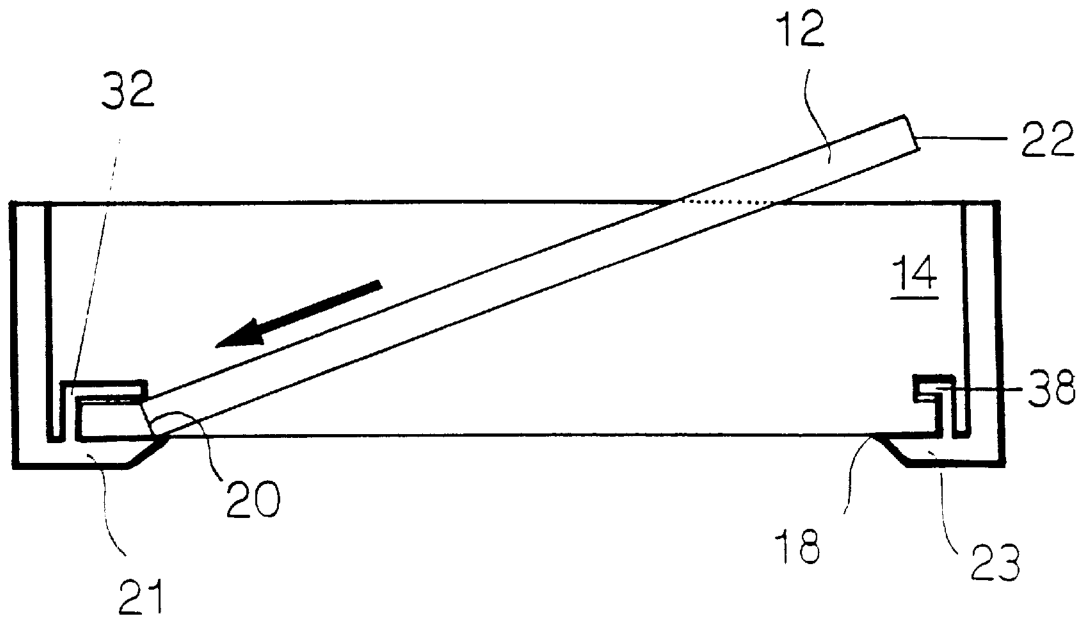
FIG. 4 to FIG. 7 are illustrative diagrams for assembling the transparent glass with the housing shown in FIG. 1.
Figure 5:
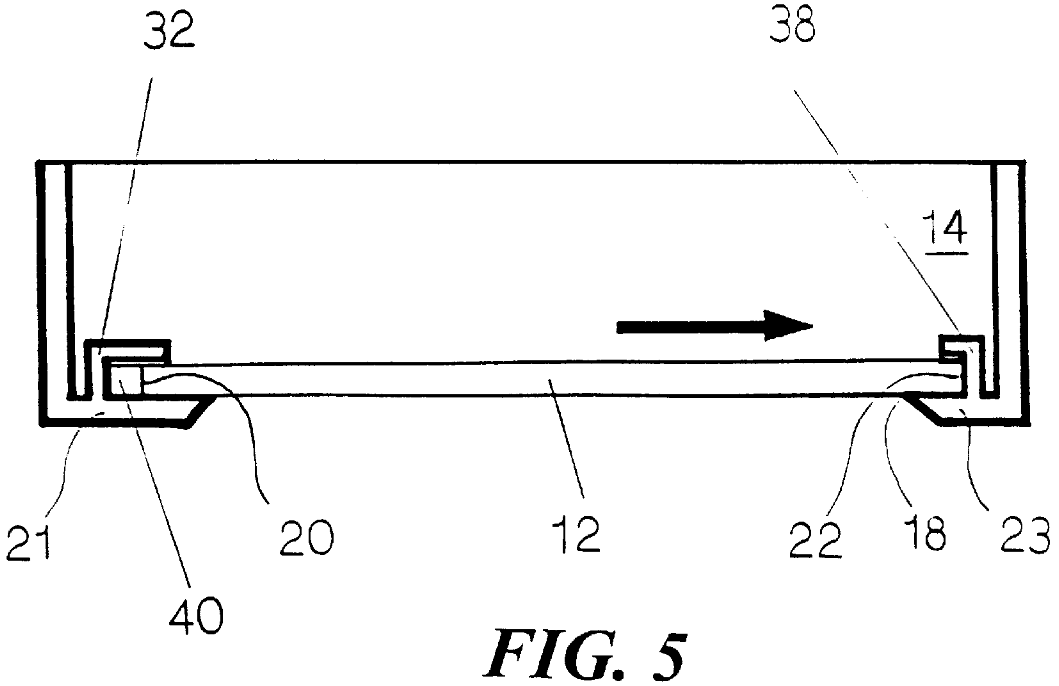
Figure 6:
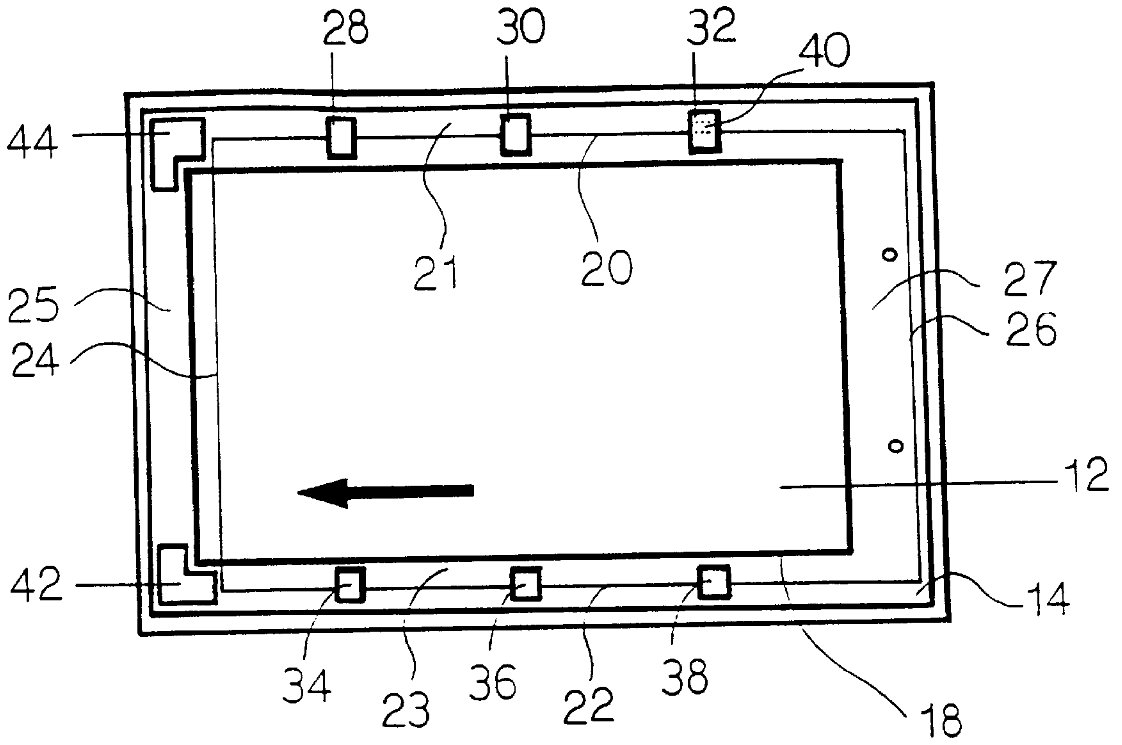
Figure 7:
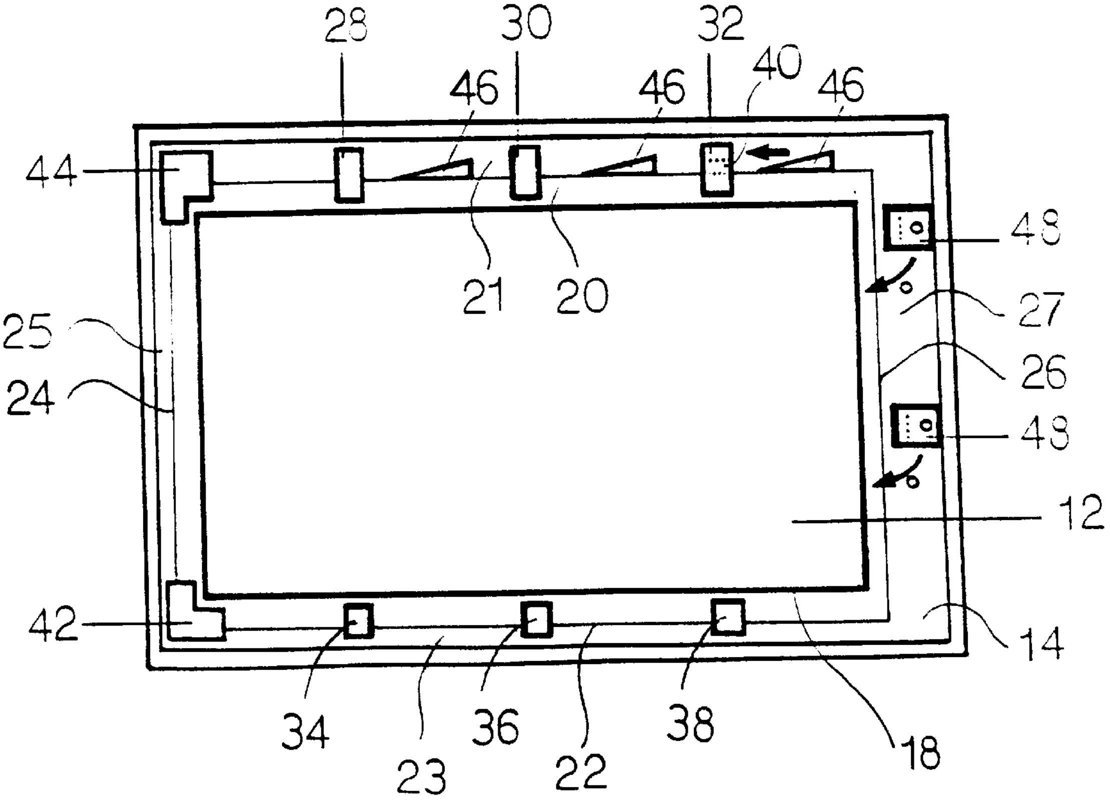

Please refer to FIG. 4 to FIG. 7. FIGS. 4 to 7 illustrates an assembly procedure for installing the transparent planar board 12 into the housing 10, wherein the top casing 14 in FIG. 4 is shown upside-down. The assembly method of the housing 10 comprises:

(1) Inserting the front end 20 of the transparent planar board 12 into the long-clasp 32 installed below the front side 21 of the opening 18 (shown in FIG. 4);

(2) Inserting the rear end 22 of the transparent planar board 12 into the short-clasp 38 installed below the rear side 23 of the opening 18 (shown in FIG. 5);

(3) Inserting the left end 24 of the transparent planar board 12 into the two corner-clasps 42, 44 installed below the left side 25 of the opening 18 (shown in FIG. 6);

(4) Installing two positioning devices 48 below the right side 27 so that the transparent planar board 12 is fixed with each of the long, short and corner-clasps (shown in FIG. 7); and (5) Plugging the latch 46 into the empty space 40 of the long-clasp 32 installed below the front side 21 of the opening 18 to prevent front-and-rear sliding of the transparent planar board 12 (shown in FIG. 7).

Figure 8:
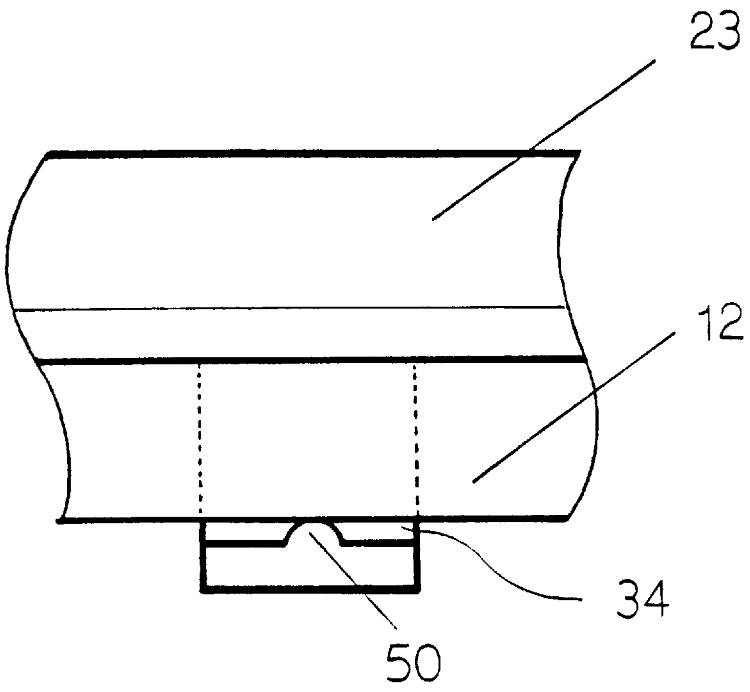
FIG. 8 and FIG. 9 are front and side views of one of the short-clasps shown in FIG. 2, respectively.
Figure 9:
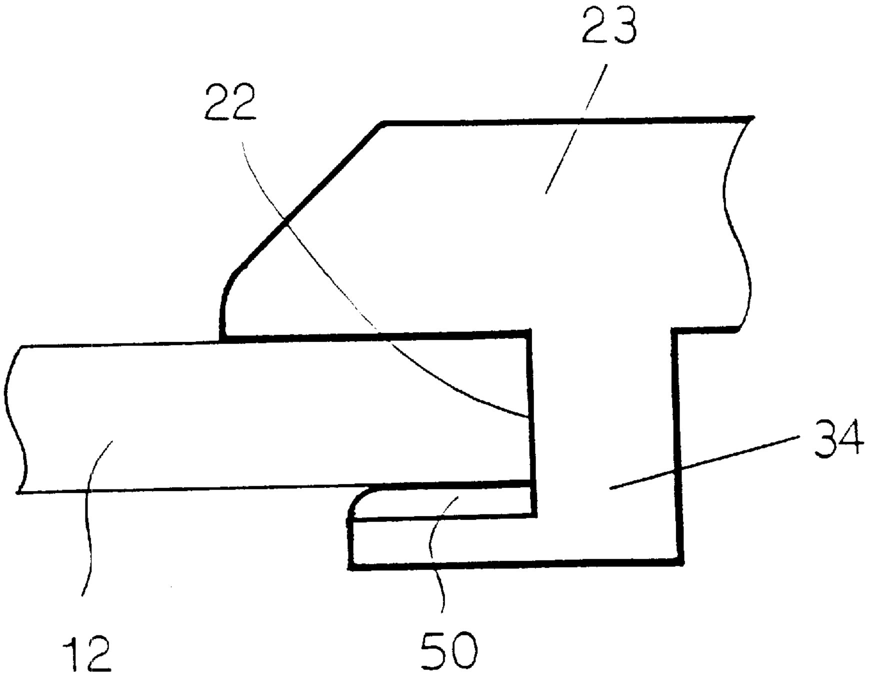

Please refer to FIG. 8 and FIG. 9. FIG. 8 and FIG. 9 are the front and side views of the short-clasp 34, respectively. The short-clasp 34 comprises a protruding edge 50 installed inside it for pushing the rear end 22 of the transparent planar board 12 against the rear side 23 of the opening 18. Likewise, the other clasps such as the other short-clasps, long-clasps, corner-clasps and the positioning device 48 shown in FIG. 10 have the same protruding edges 50 which permit tight seals between the four ends of the transparent planar board 12 and the four edges of the opening 18 thus preventing dust and impurities from entering the flatbed scanner.

From the above mentioned embodiment, the housing 10 of the present invention, instead of using double-sided tape used in a prior art flatbed scanner's housing, uses long, short, and corner clasps as well as the positioning device to anchor the ends of the transparent planar board in place. This effectively solves the problem of long-term disintegration of the double-sided tape secondary to external factors such as temperature changes, humidity and stress. The present technique lowers costs as well.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A housing of a flatbed scanner comprising:

a rectangular and transparent planar board having a front end, a rear end, a left end, and a right end for placing documents to be scanned; and a rectangular case for placing a scanning module comprising a rectangular top side and a rectangular opening installed in the middle portion of the top side having a front side, a rear side, a left side, and a right side for mounting the transparent planar board;

wherein at least one long-clasp is installed below the front side of the opening for fixing the front end of the transparent planar board, and at least one short-clasp is installed below the rear side of the opening for fixing the rear end of the transparent planar board, and two corner-clasps are installed under one of the right and left sides of the opening for fixing two corners of the corresponding end of the transparent planar board, and a positioning device is installed under the other of the right and left sides of the opening for fixing the corresponding end of the transparent planar board; and wherein each of the long-clasp, short-clasp and corner-clasps comprises a protruding edge for pushing one end of the transparent planar board against one side of the opening to permit a tight seal between the transparent planar board and the opening.

2. The housing of claim 1 wherein the installation of the transparent planar board requires first inserting the front end of the transparent planar board into the long-clasp below the front side of the opening, then inserting the rear end of the transparent planar board into the short-clasp below the rear side of the opening, then inserting the transparent planar board into the two corner-clasps installed below the opening, and then installing the positioning device to fix the transparent planar board below the opening.

3. The housing of claim 1 further comprising a latch which can be inserted into the long-clasp below the front side of the opening to prevent the transparent planar board from sliding between the long-clasp and short-clasp below the opening of the housing.

4. The housing of claim 1 wherein the rectangular case is made of plastic.

5. The housing of claim 1 wherein the transparent planar board is made of glass.

6. A housing of a flatbed scanner comprising:

a rectangular and transparent planar board having a front end, a rear end, a left end, and a right end for placing documents to be scanned; and a rectangular case for placing a scanning module comprising a rectangular top side and a rectangular opening installed in the middle portion of the top side having a front side, a rear side, a left side, and a right side for mounting the transparent planar board;

wherein at least one long-clasp is installed below the front side of the opening for fixing the front end of the transparent planar board, and at least one short-clasp is installed below the rear side of the opening for fixing the rear end of the transparent planar board, and two corner fixing means are installed under one of the right and left sides of the opening for fixing two corners of the corresponding end of the transparent planar board, and a positioning device is installed under the other of the right and left sides of the opening for fixing the corresponding end of the transparent planar board; and wherein the housing further comprises a latch which can be inserted into the long-clasp below the front side of the opening to prevent the transparent planar board from sliding between the long-clasp and short-clasp below the opening of the housing.

7. The housing of claim 6 wherein the rectangular case is made of plastic.

8. The housing of claim 6 wherein the transparent planar board is made of glass.

9. The housing of claim 6 wherein the two corner fixing means are two corner-clasps.

10. The housing of claim 9 wherein the installation of the transparent planar board requires first inserting the front end of the transparent planar board into the long-clasp below the front side of the opening, then inserting the rear end of the transparent planar board into the short-clasp below the rear side of the opening, then inserting the transparent planar board into the two corner-clasps installed below the opening, and then installing the positioning device to fix the transparent planar board below the opening.

11. The housing of claim 9 wherein each of the long-clasp, short-clasp and corner-clasps comprises a protruding edge for pushing one end of the transparent planar board against one side of the opening to permit a tight seal between the transparent planar board and the opening.

* * * * *